Figure 1:
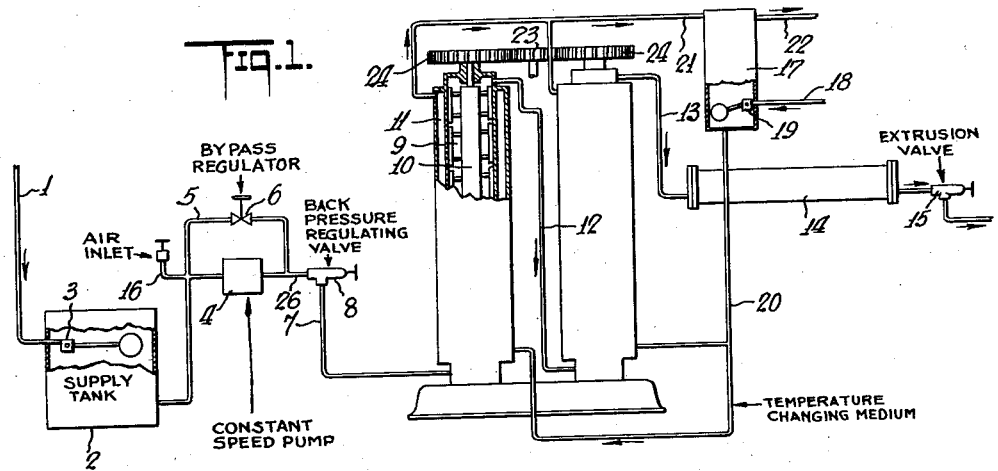

Oct. 29, 1940.　　　B. DE H. MILLER　　　2,219,656
PROCESSING OF MATERIALS
Filed July 1, 1937

INVENTOR
Bruce De Haven Miller
BY
ATTORNEYS

Patented Oct. 29, 1940

2,219,656

UNITED STATES PATENT OFFICE 2,219,656

PROCESSING OF MATERIALS

Bruce De Haven Miller, Louisville, Ky., assignor to The Girdler Corporation, Louisville, Ky., a corporation of Delaware Application July 1, 1937, Serial No. 151,439

9 Claims. (Cl. 62—114)

The processing of various materials includes the continuous delivery of the material in liquid form into and through a processing chamber where a change in plasticity or a partial crystallization or solidification is effected by agitation or temperature change, or both.

The extent of such change in state may vary with variation in the speed or character of agitation and the rate of flow or temperature of the temperature changing medium. It will also vary with different liquids or mixtures of ingredients. Different products require change in plasticity or change to different degrees. Even with careful control of the conditions it is often difficult to continuously produce a uniform product, particularly if the liquid treated be a mixture of different ingredients having different freezing, crystallizing or solidifying temperatures.

In commercial practice it has been common to maintain substantially constant the speed of the agitation and the temperature and rate of flow of the refrigerant, and vary the character of the product or obtain a desired character of product by varying the rate of flow of the raw material through the processing chamber. This varies the time it is in the chamber, and therefore the time to which the material is subjected to agitation and the action of the temperature changing medium.

To obtain the maximum output from an apparatus it is common to employ a refrigerating medium such as ammonia, and a chamber of relatively low volumetric capacity, so that the rate of flow of the material through the apparatus is comparatively rapid, and the time interval between admission and discharge very short. The maintenance of a high pressure on the material in the chamber is required for some materials, and with others it automatically develops as a result of the resistance to the flow of the material, because as it becomes stiffer or more nearly solid, a larger portion solidifies during the processing. Fluctuation in pressure often develops very rapidly with resulting variations in the rate of flow, and variations in the rate of flow cause variation in the character of the delivered product. In some cases these variations are difficult to control or counteract.

In the processing of some materials the crystallization or solidification is so rapid that when using a pump with normal slippage the time required to build up a pressure sufficient to keep a constant volume of the material moving through the apparatus would be long enough to cause the material to solidify or freeze up within said apparatus.

A positive displacement pump having a variable speed drive has been proposed as a means for forcing the material through the processing apparatus. Varying pressures within the processing chamber produce varying degrees of slippage in the pump, a varying rate of flow through the apparatus, and a varying load on the motor or other source of power. Compensating for such fluctuations cannot ordinarily be effected promptly and accurately enough by changing the pump speed.

The main objects of my invention are to obtain a rate of flow which may be quickly and easily varied through a comparatively wide range; to permit the use of a constant speed pump without the necessity or expense of a variable speed drive; to maintain the pump pressure constant and higher than the maximum pressure required in the processing chamber; to permit the pump pressure to be easily and quickly adjusted to any desired value, and regardless of pressure fluctuations in the processing apparatus; to maintain the load on the motor constant for wide variations in the rate of delivery of the material to the processing apparatus and wide fluctuation of pressure in the apparatus; and to provide a simple and inexpensive apparatus which may be easily and quickly adjusted at will.

By means of my invention I can maintain the desired constant flow of the material through the apparatus, independent of variations in rate of heat transfer, the degree of change in plasticity, the compressible gas content, or the resistance to flow. Furthermore I can rapidly vary the rate of flow in a very simple and easy manner, and by the manipulation of a single valve.

As important features of my invention I utilize a constant speed pump for continuously delivering the raw material to a portion of the system maintained at a constant pressure higher than that required in the processing chamber. The pressure developed by the pump is maintained constant by an automatic back pressure regulating valve past which the material flows to the processing chamber. The rate of flow past this valve is normally constant, regardless of changes in the pressure in the processing chamber, or the pressure differential on opposite sides of the valve. The maintained pressure may be readily changed by changing the setting of this valve. The pump delivers the raw material at a rate in excess of the maximum requirements of the processing chamber and the excess is bled off through a valve controlled outlet. As the pressure at the inlet of this valve remains constant, the rate of bleeding off will be constant for any given valve setting. By changing the valve setting the rate of bleeding off may be varied without varying the maintained pressure, but with a corresponding change in the rate of flow past the automatic back pressure valve into the processing chamber.

Thus the processing chamber is continuously supplied from a source under sufficient pressure to overcome any variations in pressure in the processing chamber, and the rate of flow to the processing chamber is normally constant because the rate of supply to the pressure system and the rate of escape and return of excess from the pressure chamber is normally constant, but the rate of flow as well as the supply pressure delivered to the processing chamber may be readily and easily adjusted at will.

Figure 2:
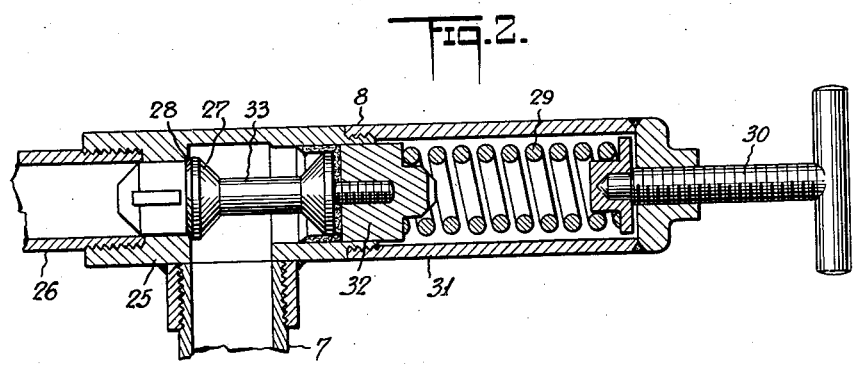
Figure 3:
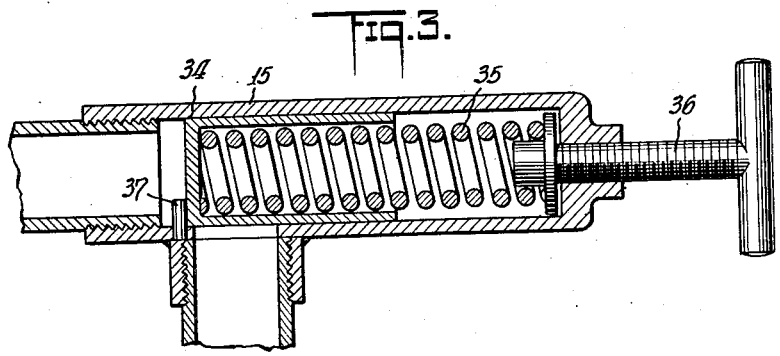

In the accompanying drawing I have illustrated one embodiment of my invention. In the drawing:

Fig. 1 is a diagrammatic general assembly view of the apparatus parts which may be employed, Fig. 2 is a sectional detail of the automatic back pressure regulating valve, and Fig. 3 is a sectional view of an extrusion valve which may be employed to maintain the desired pressure in the processing chamber.

In the assembly of parts as shown in Fig. 1 the raw material, such as vegetable or animal oil or fat in liquid condition, may be delivered through a pipe 1 into a storage tank 2 in which the level may be maintained substantially constant by a float valve 3. The material is withdrawn from the supply tank 2 by a pump 4 which is preferably of the positive displacement type and adapted to be driven at constant speed. The pump has a capacity in excess of that required in the processing apparatus, and the excess is returned from the delivery side of the pipe through a bypass 5 either to the inlet side of the pump or to the supply tank. This bypass includes a regulating valve 6 which may be of the ordinary manually operated needle type, so that by adjusting this valve the amount of material bled off from the delivery side of the pump may be readily controlled. In the pipe 7 leading to the processing apparatus is an automatic back pressure regulating valve 8, one form of which is shown more in detail in Fig. 2.

The processing chamber may include a single unit or two or more units connected in parallel or in series. As shown there are two processing chambers 9, each having an agitator 10 for scraping any solidified material from the wall of the chamber and for maintaining the material in a homogeneous condition. The chamber has a refrigerating jacket 11 through which any suitable refrigerant may be delivered at any suitable rate and at any suitable temperature depending upon the nature of the raw material being treated and the extent of change of state which is desired. Two of these processing chambers are illustrated, the raw material entering the lower portion of the first chamber through the pipe 7 and flowing from the upper portion of the chamber through a pipe 12 to the lower portion of the second chamber and then through a pipe 13 to a chamber 14 which may be of any suitable character, for instance as shown in the Bottoms and Wood Patent 2,013,025. The purpose of this chamber may be to permit setting of the supercooled liquid, the intermixing of the ingredients by an agitator or transverse screen, or the breaking up of lumps, or for any other desired purpose.

Where it is desired to maintain a pressure in the processing chambers, the outlet from the chamber 14 may be provided with an extrusion valve 15, one form of which is shown in Fig. 3. Where it is desired to incorporate air during the processing of the material, the pipe leading to the pump inlet may be provided with an air inlet valve 16 which will cause the pump to suck in air from the atmosphere along with liquid from the tank 2. Where it is desired to employ a volatile refrigerant there may be provided an accumulator 17 to which liquid ammonia is delivered through a pipe 18 and controlled at a predetermined level by a float valve 19. The liquid from the accumulator is delivered through a pipe 20 to the lower portions of the jackets 11 of the processing chambers and the gas and any excess unvolatilized liquid may return to the upper portion of the accumulator through a pipe 21 and the gas returned from the accumulator through a pipe 22 for recompression and reliquefaction. The agitators in the chambers may be driven in any suitable manner, for instance, they may be driven at the same speed by a gear 23 meshing with gears 24 on the upper ends of the agitator shafts. The pinion 23 may be driven from any suitable source of power, and preferably at a substantially uniform rate.

The particular type of back pressure regulating valve 8 as shown in Fig. 2 includes a housing 25 provided with an inlet 26 leading from the discharge side of the pump 4 and an outlet connected to the pipe 7. Within the housing is a valve 27 normally pressed against a valve seat 28 by means of a coil spring 29, the tension of which may be adjusted by a screw 30. The spring is mounted in an extension 31 of the housing, and slidably mounted in this extension is a piston 32 of larger diameter than the valve 27 and connected to the latter by a valve stem 33.

The extrusion valve 15 shown in Fig. 3 includes a piston 34 normally held in position to prevent or impede outflow, by means of a spring 35, the tension of which may be adjusted by a screw 36. The piston when in its innermost position abuts against a stop 37. When the pressure in the system reaches a predetermined limit the piston will be forced back against the spring and will permit outflow from the system at the same rate as the material is delivered to the processing chamber, but will insure the maintenance of the desired pressure at all times in the processing chamber.

As an example of the manner in which the apparatus may operate, it may be assumed that the spring 29 of the back pressure regulating valve is set to keep the valve 27 closed when the pressure in the inlet 26 to this valve from the pump is less than 350 pounds per square inch. The pump may be set to deliver 9000 pounds of oil per hour at a pressure of 350 pounds per square inch, and it may be desired to treat 7500 pounds of material per hour under the conditions of refrigeration and agitation employed. The valve 6 is thus set to permit the bleeding off or return of 1500 pounds of material per hour at 350 pounds pressure. This pressure is materially higher than that which it is desired to employ in the processing chamber or for which the valve 15 is set, but due to variations in the conditions of operation the pressure in the processing chamber may fluctuate between the pressure fixed by the extrusion valve and some pressure lower than the aforesaid 350 pounds pressure.

As the pressure in the pipe line between the pump, the intake of the by-pass regulator 6 and the intake of the back pressure regulating valve remains constant, the pressure differential on opposite sides of the valve 6 will remain constant, and the valve may be set to bleed off material at any desired rate and with very great accuracy.

Upon starting the processing, the material delivered by the pump 4 will develop the pressure of 350 pounds per square inch before opening the valve 27. With the valve 27 open to any particular degree the rate of flow will vary with the pressure differential at the inlet and outlet of the valve. With the pressure in the processing chamber very low, for instance by a very low adjustment on the spring 35 or by the complete omission of the extrusion valve, the pressure differential on opposite sides of the valve 27 will be high, and the desired rate of flow will be obtained with the valve 27 open to only a limited extent against the action of the spring 29. As the pressure builds up or fluctuates in the processing chamber, the pressure differential on opposite sides of the valve 27 will change, but the increase in pressure in the pipe 7 will act on the piston 32 to supplement the spring 29 so that when the pressure differential is small, that is, when the pressure in the pipe 7 is high, the valve 27 will open to a greater extent to maintain the desired uniform rate of flow and at the same time the uniform pressure in the inlet 26 to the back pressure regulating valve. Thus with the setting above referred to, there will be a constant and uniform flow of material through the processing chamber regardless of pressure fluctuations in said chamber because the pump is delivering at a constant rate against a constant pressure and a predetermined amount of excess is bled off through the by-pass 5. The pressure which is to be maintained to overcome any pressure fluctuations in the processing apparatus may be readily adjusted by changing the adjustment of the spring 29.

If it is desired to deliver more than 7500 pounds of material per hour with the pump 4 delivering 9000 pounds, then the by-pass valve 6 may be partially closed so as to bleed off a smaller amount, but this will not change the pressure maintained against the valve 27. Similarly the delivery of a smaller amount to the processing chamber is accomplished by a simple opening of the by-pass valve 6 and the return of a larger proportion of the material delivered by the pump.

The operator when processing a particular material will seldom find it necessary to adjust the back pressure regulating valve as this is set to maintain a pressure higher than that required at any time in the processing chamber, but if the material is not being delivered in the properly processed state, that is, if it is coming out too stiff or too soft, the valve 6 may be quickly and easily adjusted to increase or decrease the speed of flow through the processing chamber and consequently the time during which the material is subjected to the action of the temperature changing medium and to the agitator.

In my improved process and by means of my improved apparatus, an adequate supply of material is maintained under an adequate and constant pressure, the rate of delivery from the pressure source through the apparatus is constant in spite of pressure variations in the apparatus beyond the regulating valve, and the amount delivered past the regulating valve and through the apparatus is normally constant regardless of pressure fluctuations, but may be adjusted without changing the pressure in the pressure source built up by the pump.

The valve mechanisms employed are very simple and inexpensive compared to a variable speed drive for the pump, and they are far more quickly and accurately adjusted to take care of varying conditions in the system, or for the proper treatment of various materials.

The operation is very much simpler and more accurate than any control which varies either the refrigerant flow or the refrigerant temperature or the pump speed. The adjustment of input against any pressure is accomplished merely by the operation of the needle valve 6. If the amount of heat exchange is varied by adjusting the back pressure on a volatile refrigerant, the amount of work to be done by the compressor is varied and the compressor does not work at its best efficiency. Furthermore such regulation requires a very sensitive control valve and involves a time lag in correcting or varying conditions. If the input of material is varied by means of a variable speed drive for the pump, the apparatus is expensive, the adjustment is not ordinarily sufficiently sensitive, and there is an important time lag.

Although it is preferable to employ a positive displacement pump, it will be evident that inasmuch as the pump operates against a constant pressure, there will be a constant delivery with a constant slip if the pump be of centrifugal or other type.

Having thus described my invention, what I claim as new and desire to secure by Letters Patent is:

1. An apparatus for treating vegetable oil compounds under pressure, including a processing chamber having an inlet and an outlet, an agitator in said chamber, a refrigerating jacket for said chamber, a back pressure resistance valve at the outlet for yieldingly resisting the discharge therefrom, a constant speed, constant volume pump for supplying said compound in liquid form to said inlet, an automatic pressure controlled valve between said pump and said inlet for maintaining the pressure between the pump and said valve substantially constant and higher than the pressure required in said chamber, an outlet between said pump and said last mentioned valve, and a manually controlled valve in said last mentioned outlet for permitting escape of a predetermined portion of the compound delivered by said pump and thereby controlling the amount of liquid delivered from said constant pressure portion of the system to said chamber.

2. An apparatus for treating compounds under pressure, including a processing chamber having an inlet, an agitator in said chamber, a refrigerating jacket for said chamber, a constant speed, constant volume pump, an automatic pressure controlled valve between said pump and said inlet for maintaining the pressure between the pump and said valve substantially constant and higher than the pressure required in said chamber, and an outlet between said pump and said valve for permitting escape of a predetermined portion of the compound delivered by said pump and thereby controlling the amount of liquid delivered from said constant pressure portion of the system to said chamber.

3. An apparatus for continuously converting a liquid to a semi-solid state under pressure, including a processing chamber, means for refrigerating said chamber, means for continuously delivering said liquid under pressure and at a substantially constant rate in excess of the normal processing capacity of said chamber, and connections between said means and said chamber including an outlet for excess liquid, a valve between said outlet and said chamber for maintaining the pressure between said valve and said delivering means substantially constant, and means exposed to the pressure on the outgo side of said valve for opening said valve upon increase in the pressure on the outgo side.

4. An apparatus for processing a liquid which at least partially solidifies upon being refrigerated, said apparatus including a refrigerating chamber, a constant speed pump for continuous delivery of the material to said chamber and continuously forcing said material through the chamber at a uniform rate, a valve between said pump and said chamber, a spring acting on said valve to close it against the flow to maintain a pressure on the discharge side of the pump higher than the pressure in said chamber, and means controlled solely by the pressure on the discharge side of the valve for opening said valve with the flow, to such an extent that the rate of flow past said valve remains constant and independent of pressure variations in said chamber but the extent of opening of the valve varies with said pressure variations.

5. An apparatus for treating a liquid to change the plasticity thereof, including a treating chamber having an inlet and an outlet for the continuous passage of said liquid therethrough at a uniform rate, means for refrigerating said chamber to change the plasticity of the liquid during its flow through said chamber, a constant speed pump having a conduit for delivering the liquid to said inlet, a by-pass around said pump, a valve in said by-pass adjustable to control the rate of return of liquid from the discharge side of the pump to the inlet side and thereby control the rate of liquid delivery from said pump to said chamber inlet, and means in said conduit between said by-pass and said chamber inlet, and controlled by the pressure developed in said chamber, for maintaining the pressure at the delivery side of said pump higher than the pressure in said chamber and substantially constant regardless of variations in pressure in said chamber.

6. An apparatus for treating a liquid to change the plasticity thereof, including a treating chamber having an inlet conduit and an outlet for the continuous passage of said liquid therethrough, means for refrigerating said chamber to change the plasticity of the liquid during its flow through said chamber, a constant speed pump for delivering the liquid to said inlet conduit, a by-pass around said pump, a valve in said by-pass adjustable to control the rate of return of liquid from the discharge side of the pump to the inlet side and thereby control the rate of liquid delivery from said pump to said chamber inlet, a valve member in said conduit beyond said by-pass, a spring normally acting to move said valve to closed position against the direction of flow through said conduit, and a piston exposed to the pressure of the liquid on the discharge side of said valve and rigidly connected to and larger than said valve, whereby said valve is opened against the action of the spring and by the pressure of the liquid on said piston at the outlet side of said valve.

7. An apparatus for treating a liquid to change the plasticity thereof, including a treating chamber having an inlet conduit and an outlet for the continuous passage of said liquid therethrough, means for refrigerating said chamber to change the plasticity of the liquid during its flow through said chamber, a constant speed pump for delivering the liquid to said inlet conduit, means in said conduit between said pump and said chamber inlet and controlled by the back pressure developed by the resistance to flow of the refrigerated liquid through said chamber for maintaining the pressure at the delivery side of said pump higher than the pressure in said chamber and substantially constant regardless of variations in pressure in said chamber, an outlet between said pump and said valve, and a manually operable valve for controlling the rate of discharge through said outlet from said constant pressure portion of the system and thereby controlling the delivery from said constant pressure to said chamber.

8. An apparatus for maintaining a uniform rate of flow of a liquid subjected to refrigerating action and independent of variations in plasticity and resistance to flow caused by such refrigerating action, said apparatus including a refrigerating chamber, a conduit leading thereto, a constant speed pump for continuous delivery of the material at a uniform rate to said chamber through said conduit, and continuously forcing said material through the chamber, a valve member in said conduit, a spring normally acting to move said valve to closed position against the direction of flow through said conduit, a piston exposed to the pressure of the liquid on the discharge side of said valve and rigidly connected to and larger than said valve, whereby said valve is opened against the action of the spring by the pressure of the liquid on said piston at the outlet side of said valve, an outlet between said pump and said valve, and a manually operable valve for controlling the rate of discharge through said outlet from said constant pressure portion of the system and thereby controlling the delivery from said constant pressure to said chamber.

9. An apparatus for processing a liquid to convert it to a semi-solid state, which includes a closed refrigerating chamber having an inlet and an outlet, a constant speed, constant volume pump for positively forcing the liquid through said chamber at a uniform rate and against any back pressure developed in said chamber due to increase in stiffness of the material, a valve in the connections between said pump and said chamber, and movable toward closed position against the flow of the liquid, a spring acting to close said valve, said valve being opened against the action of the spring by the pressure between the valve and said pump, and said spring serving to maintain said pressure substantially constant and substantially greater than that developed in said chamber, a movable member connected to said valve and exposed to the pressure existing between said chamber and said valve, and actuated by said last mentioned pressure to open the valve against the action of said spring, and means for withdrawing liquid delivered by said pump and in advance of said valve, whereby the amount of liquid forced through said chamber is controlled.

BRUCE DE HAVEN MILLER.